March 14, 1944.  E. BONFIGLIOLI  2,344,076
PROCESS OF MAKING ORNAMENTAL FIGURES
Filed March 16, 1940
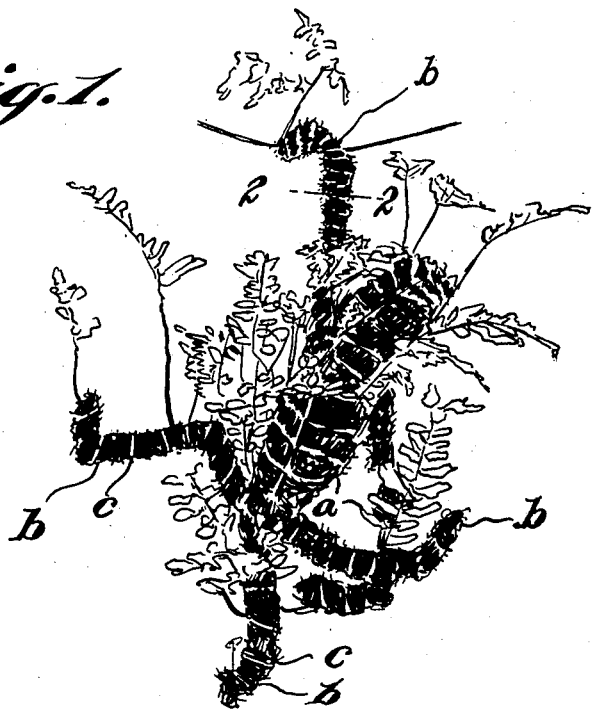

Patented Mar. 14, 1944

2,344,076

UNITED STATES PATENT OFFICE 2,344,076

PROCESS OF MAKING ORNAMENTAL FIGURES

Enrico Bonfiglioli, Bologna, Italy; vested in the Alien Property Custodian

Application March 16, 1940, Serial No. 324,426
In Italy December 10, 1934

1 Claim. (Cl. 47—58)

This application is a continuation-in-part of my application Ser. No. 50,978, filed Nov. 21, 1935.

The present invention relates to a process for producing ornamental figures from live plants and also to the figures produced by said process.

The process comprises the steps of shaping a wire member or the like to serve as a basis or core for the desired ornamental figure. The figures, of course, may represent animals, puppets, or any other desired article. After having formed the basic shape of the desired wire figure, a number of branches are placed about the wire either spirally or in parallel relationship therewith. The branches consist of the rhizome of a fern of the Polypodium genus. Such rhizomes generally have the form of elongated bodies which sprout and they can, therefore be trimmed or cut without destroying the vitality of the plant. After having placed several of the branches of the rhizome about the wire structure they are secured in place by wrapping the branches spirally with a ligature which may be made of metal wire of a gauge smaller or lighter than the wire core. It is, of course, obvious that a series of separate windings of the ligature may be used instead of a spiral winding, but the latter is preferable since it consumes less time and material and is equally effective. The figure when completed may be suspended in the air and the rhizome will grow and sprout when sprinkled with water occasionally. It has been found that the rhizome of the Polypodium fern which normally grows in the soil may be kept alive in the air by merely watering if a plurality of the branches are bound together and thereby held in intimate contact with each other. If the branches of the rhizomes should be separately suspended in the air they will not grow or sprout. So, a characteristic feature of the invention is the particular method of placing rhizomes together so as to grow.

In the drawing,

Fig. 1 discloses a completed figure which represents the body of a monkey,

Fig. 2 is a cross-section taken on the line 2—2 of Fig. 1 on an enlarged scale, and Fig. 3 is a longitudinal sectional view of the same.

Referring now more particularly to the drawing, in which similar reference characters are employed in the several views, $a$ represents the main body of the figure forming the trunk and head of the monkey. $b$ indicates the arms, legs, and tail of the monkey and $c$ the ligature serving to bind the branches $d$ of the rhizome together about the wire frame $e$.

It can be seen in Fig. 3 that the branches $d$ of the rhizome may be arranged in overlapping relationship along the wire frame $e$ and in intimate contact with each other. This arrangement enables the branches to retain moisture and grow as they would in the soil.

What I claim is:

A method of producing ornamental figures from live Polypodium fern plants consisting in shaping a wire member to correspond substantially with the desired figure, arranging a plurality of the rhizomes of ferns of the Polypodium genus lengthwise along said wire member in side by side relation and with some of the rhizomes laterally overlapping other rhizomes, and binding the rhizomes and wire member with a ligature into a substantially cylindrical bundle, the ligature being tightened enough to produce and maintain intimate contact between adjacent rhizomes.

ENRICO BONFIGLIOLI.